Nov. 2, 1965 L. J. OWEN ETAL 3,215,278
FILTER COATING COMPOSITION
Filed April 4, 1962
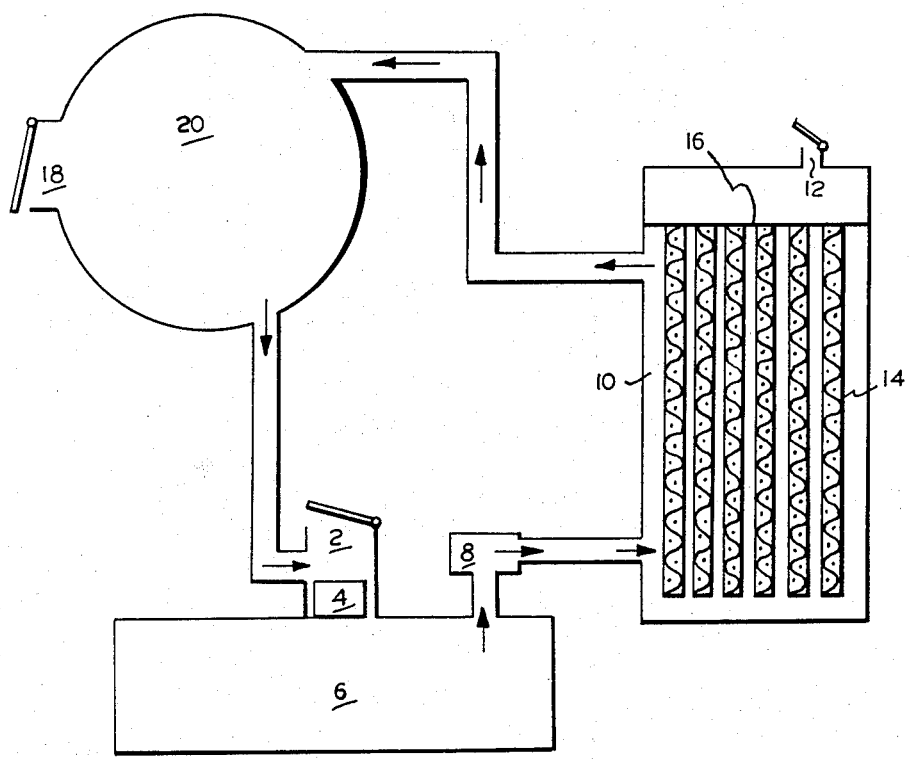
INVENTORS
LOUIS J. OWEN
BY  EDWIN G. HARDIN
*Julius J. Denzler*
*Neal T. Levin*
ATTORNEYS United States Patent Office 3,215,278
Patented Nov. 2, 1965

3,215,278
FILTER COATING COMPOSITION
Louis J. Owen, Summit, and Edwin G. Hardin, Chatham, N.J., assignors to Nopco Chemical Company, Newark, N.J., a corporation of New Jersey
Filed Apr. 4, 1962, Ser. No. 185,028
2 Claims. (Cl. 210—502)

This invention relates to a process of dry cleaning. More particularly, this invention relates to a dry cleaning process employing a filter bed prepared using a siliceous amino compound.

Fabrics, and particularly clothing, become contaminated through constant use with soil, body acids and oils, and salt. When these fabrics are dry cleaned, an organic solvent and a detergent comprise the materials used in the dry cleaning process to remove these contaminants. The contaminants which are removed, remain dissolved or suspended in the organic solvent. The organic solvent is then reused many times, by continuously recycling and filtering it, for many batches of fabrics. After the organic solvent has become badly contaminated, through constant reuse, it is distilled and used again. However, it is obvious that between distillations, the organic solvent is contaminated and becomes progressively more contaminated with use. This is so even if fresh solvent is periodically added after each dry cleaning cycle to replace solvent lost as a result of evaporation and adherence to the cleaned fabrics. In order to combat this contamination between distillations and after each dry cleaning cycle, the organic solvent is passed through a filter bed containing diatomaceous earth. This filter bed is effective in removing undissolved particles of matter, but is not effective in removing from the dry cleaning solvent, body acids and oils which then unavoidably come in contact with the next batch of fabrics. Therefore, after the organic solvent has been initially used, or initially used after distillation, to clean fabrics, subsequent batches of fabrics are exposed to additional body acids and oils and the final dry cleaned fabrics may contain more body acids and body oils than was present before dry cleaning. Moreover, fabrics such as draperies, which are ordinarily not contaminated with body acids and body oils, after being dry cleaned with materials which contain body acids and oils, may themselves be contaminated with body acids and body oils.

An object of this invention therefore is to provide a means for removing body acids and body oils from dry cleaning solvents during continuous cycling of said dry cleaning solvents.

Other objects and advantages will become apparent from the following more complete description and claims.

Broadly, this invention contemplates a process of removing acidic materials from dry cleaning solvents during the dry cleaning of fabrics, said acidic materials being liquid materials and dissolved solid materials, comprising intimately contacting a dry cleaning solvent with a siliceous amino compound.

This invention also contemplates a filter coating composition for use in dry cleaning systems, comprising diatomaceous earth and a siliceous amino compound.

Reference is now made to the drawing, which is a schematic view of the normal direction of flow, preparatory to and during the dry cleaning process, of the dry cleaning media through the dry cleaning apparatus, as represented by the arrows. To initially coat filter elements 14, the dry cleaning media, filter media and siliceous amino compound is placed into the filter 10 by insertion into opening 12. Opening 12 is then closed and pump 8 started to initially provide a pressure of from 2 to 5 p.s.i.g., and the filter media and siliceous amino compound coat filter elements 14 which are held in place by holding means 16. After filter elements 14 have been coated with the filter media and siliceous amino compound, pump 8 is stopped and the fabrics to be cleaned are placed, through opening 18, into the rotatable cleaning wheel 20. Thereafter, opening 18 is closed, and rotation of the inner cleaning wheel (not shown) of cleaning wheel 20 is commenced by actuating means (not shown), the pump 8 started and the dry cleaning process commences. During the dry cleaning operation, for any particular load of fabrics, the dry cleaning media is continously pumped through the now rotating cleaning wheel 20, past now closed opening 2 and through catch member 4 which traps and holds large particulate matter, into the charge tank 6 from which it then passes into the filter 10 where acidic materials are removed by the filter elements which are coated with a mixture of diatomaceous earth and a siliceous amino compound. At the end of each cleaning cycle, pump 8 is stopped and the fabrics are removed from the now stationary cleaning wheel 20. Then additional filter media and siliceous amino compound are place through opening 2 and through catch member 4 into charge tank 6. Opening 2 is then closed, another load of fabrics is placed into cleaning wheel 20 which is then rotated by rotating means and pump 8 is started to initiate another cleaning cycle and to pump the additional filter media and siliceous amino compound to filter 10 where it is added to the existing coating of filter elements 14.

As used in the specification and claims, the term diatomaceous earth means diatomite, diatomaceous silica, kieselguhr, and other synonyms. Generally, any form of diatomaceous earth can be used such as Celite, kieselguhr, and the like.

The term siliceous amino compound encompasses products prepared according to U.S. Patent No. 2,967,828, Ihde, issued January, 1961; products prepared according to copending applications Serial Nos. 836,086, filed August 26, 1959, now Patent No. 3,129,181 issued April 14, 1964; 86,323, filed February 1, 1961, now U. S. Patent No. 3,168,539, issued February 2, 1965; 107,320, filed May 3, 1961, now Patent No. 3,129,178, issued April 14, 1964; 121,350, filed July 3, 1961; and 138,566, filed September 18, 1961, now Patent No. 3,129,177, issued April 14, 1964. The above disclosed patent and patent applications are hereby incorporated herein by reference.

In general, siliceous amino compounds can be prepared by reacting stoichiometric amounts of a water-soluble silicate salt such as sodium silicate, potassium silicate, ammonium silicate and the like with any one of, or a mixture of partial amide salts, such as the acetate salt of the monoamide of hydrogenated tallow fatty acids and tetraethylene pentamine, and the like; imidazoline salts such as the sulfate salt of the imidazoline compound of two moles of stearic acid with one mole of diethylene triamine, and the like; oxazoline salts as the propionate salt of the oxazoline compound of one mole of monoethanolamine with one mole of lauric acid, and the like; quaternary ammonium salts such as dimethyl dioctadecyl ammonium chloride, and the like; and amine acid addition salts.

While the above is the basic reaction, conditions may be varied in that excess silicate salt can be used. When excess silicate salt is used, the resultant siliceous amino compound is absorbed and/or complexed upon the surface of the silica. For example, the excess silicate salt may be converted to a colloidal fine silica such as a silica gel or sol by treating the silicate salt with an acid such as sulfuric acid. Thereafter a stoichiometric amount of the silicate is reacted with a partial amide salt, imidazoline salt, etc. or mixtures thereof, in the presence of said gel or sol. Alternatively, the partial amide salt, amine acid addition salt, etc. may be initially reacted with an excess of the silicate salt and the excess silicate salt then converted to silica, or both of the above methods for preparing a siliceous amino compound containing free silica may be combined, i.e., excess silicate may be converted to a colloidal fine silica and the partial amide salt, mixtures of partial amide salts, oxazoline salt, or mixtures thereof may then be reacted with additional excess silicate salt and the excess silicate salt may then be converted to free silica by treatment with an acid such as hydrochloric acid and the like. Up to about 95% by weight, of the siliceous amino compound, may be free and combined silica. If free silica is present, there may be present up to 85% by weight of free silica based on the weight of the entire composition.

Additives, such as fluosilicic acid or a water-soluble fluosilicate salt may also be added as described in copending application Serial No. 86,323 now Patent No. 3,129,181. Generally speaking, the fluosilicic acid or fluosilicate salts may be present at any stage of the preparation as long as it is present either before or during the formation of the siliceous amino compound. Among the water-soluble fluosilicate salts which can be used are sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate, and the like.

Siliceous amino compounds may also be prepared using aromatic compounds, i.e., isophthalic acid, terephthalic acid, and water-soluble salts thereof, as an additive. The use of isophthalic acid, terephthalic acid, and their water-soluble salts in preparing siliceous amino compounds is described in copending patent application Serial No. 107,320, filed May 3, 1961, now Patent No. 3,129,178, issued April 14, 1964.

The isophthalic acid, terephthalic acid or water-soluble salts thereof can be added at any time during the preparation and prior to the drying of the filter cake. If desired, isophthalic acid or terephthalic acid can be added in such a manner so that they remain part of the siliceous amino compound and are interspersed in and around the siliceous amino compound particles. This is done by precipitating isophthalic acid or terephthalic acid from its water-soluble salt at any time before removing water from the reaction slurry containing the siliceous amino compound. In order to keep the isophthalic acid or terephthalic acid as a part of the composition of the siliceous amino compound, the slurry, before water is removed by filtering, decanting, centrifuging or the like, must be acid. If it is alkaline, then the isophthalic or terephthalic acid will be converted to their water-soluble salts, and upon filtering and washing the filter cake, or upon removing water in any other manner such as by centrifuging and the like, the water-soluble salt will be substantially removed and the siliceous amino compound will be devoid of isophthalic or terephthalic acid.

If an imidazoline or oxazoline salt or a mixture of short and long chain partial amide salts has been used to prepare a siliceous amino compound, then the procedure described in copending patent application Serial No. 121,350 and Patent No. 3,129,177 can be utilized.

Generally speaking, these two patent applications relate to the removal of ordinarily non-removable water from siliceous amino compounds prepared using such salts, before drying said siliceous amino compound. After a siliceous amino compound has been prepared using said imidazoline or oxazoline salts according to copending patent application Serial No. 121,350, or a mixture of short and long chain partial amide salts according to copending patent application Serial No. 138,566 now Patent No. 3,129,177, water is initially mechanically removed as by filtering, centrifuging, decanting, and the like. Thereafter the siliceous amino compound is frozen, thawed out, and water is again removed, by filtering the thawed out cake.

The mixture of partial amide salts referred to above is the reaction product of a partial amide with an acid such as acetic acid, propionic acid, hydrochloric acid, sulfuric acid, phosphoric acid, and the like. These acids can also be used to prepare other salts such as imidazoline salts, oxazoline salts, amine acid addition salts, etc. which are used in preparing siliceous amino compounds. Referring again to the above mixture of partial amides, they are mixtures of (1) the reaction product of a polyamine with a four or five carbon acid such as butyric acid, valeric acid, crotonic acid, alpha chloro butyric acid, and the like and (2) the reaction product of a polyamine with an acid of at least twelve carbon atoms such as lauric, tridecylic, myristic, pentadecylic, margaric, stearic, mondecylic, arachidic, oleic, linoleic, ricinoleic, palmitic, hydrogenated tallow fatty acids, napthenic, tall oil acids, abietic acid and the like.

In all of the aforedescribed methods and variations for preparing a siliceous amino compound, one or more water-insoluble organic liquids, as described in copending application Serial No. 836,086, filed August 26, 1959, now Patent No. 3,129,181, may be used in preparing a siliceous amino compound. The water-insoluble organic liquid, if used, must be present no later than when the siliceous amino compound is formed, if said liquid is to be of optimum value. Some of the water-insoluble organic liquids which can be used are varnish maker's and painter's naphtha, xylene, n-butanol, capricaldehyde, benzene, vegetable and fish oils, and the like. Moreover, we can use water-insoluble materials which are solids at room temperatures, but are liquids at the operating temperatures of our process, such as eicosane, paraffin and the like.

The ratio of siliceous amino compound to filter media used in preparing the filter coat and when added between dry cleaning cycles can vary widely. Generally speaking, we prefer to use from about six to ten parts by weight of filter media, which is generally diatomaceous earth or the like, to one part of siliceous amino compound. While a greater or lesser ratio than that indicated may be used, there is no advantage in employing such greater or lesser ratios, and if too large a ratio of diatomaceous earth to siliceous amino compound is used, then optimum reduction of the amount of fatty acids present may be effected.

The ratio used of filter media and siliceous amino compound to dry cleaning media will vary widely depending on the type, size, and number of filter elements used, and the capacity of the filter itself as well as the capacity of the dry cleaning apparatus. However, the optimum ratio for each system may be easily determined by one skilled in the art taking into consideration the foregoing factors.

The siliceous amino compounds can be used in the dry cleaning process with any of the dry cleaning solvents normally used. Among the dry cleaning solvents normally employed in dry cleaning operations are gasoline, kerosene, trichloroethylene, tetrachloroethylene, carbon tetrachloride, Stoddard solvent, and the like.

If desired, a small amount of water may be present in the dry cleaning solvent. The amount of water present should not exceed about 0.002% by weight of the dry cleaning solvent used. This amount of water is soluble in the dry cleaning solvent used and is helpful in removing water-soluble contaminants from the fabrics. If more than 0.002% of water is used, then there is the risk that some or all of the fabrics being dry cleaned will shrink. The water may be present by directly adding a calculated amount of water to the dry cleaning solvent or by using a filter media, i.e, diatomaceous earth, or/and siliceous amino compound which contain the desired amount of water.

Whether or not water is present, a small amount of dry cleaning solvent soluble soap or detergent may also be used to help clean the fabrics. The amount of soap or detergent present during any dry cleaning cycle may vary up to about 4% by weight of the dry cleaning solvent used. If more than 4% and up to about 6% of soap or detergent is used, then it is necessary to rinse the dry cleaned fabrics in order to avoid soap or detergent deposition on said fabrics. If more than about 6% is used, then there is considerable risk that the dry cleaned fabrics will have spots.

The aforedescribed components are circulated in the dry cleaning system, and the filter elements are coated with the filter media, i.e., diatomaceous earth, and siliceous amino compound, as aforedescribed.

The dry cleaning process itself may vary in that, if a suitable cutoff valve is supplied between filter 10 and rotatable cleaning wheel 20, then pump 8 need not be stopped between dry cleaning cycles and pump 8 can be used to maintain a pressure sufficient to hold the filter powder composition against filter elements 14.

Although the pump 8 initially provides a pressure of from about 2 to 5 p.s.i.g., this pressure gradually builds up after successive dry cleaning cycles to from about 20 to 30 p.s.i.g. If the pressure exceeds 30 p.s.i.g., then the flow of the dry cleaning media, i.e., dry cleaning solvent, water, if present, and soap or detergent, if present, passes through filter 10, but by-passes coated filter elements 14 and the dry cleaning cycle becomes ruined in that the solid contaminants and liquid and dissolved acidic materials are not removed, but instead are returned to cleaning wheel 20 where the fabrics are recontaminated.

At the end of any dry cleaning cycle, but normally at the end of a day's operations, the filter elements are cleaned. The manner in which the filter elements are cleaned depends upon the type of filter elements used. Thus, cloth covered filter elements can be cleaned by arranging the piping of the dry cleaning apparatus in such a manner that the direction of flow of the dry cleaning media may be reversed against the filter coating thereby forcing the filter coating from the filter elements rather than holding the filter coating against the filter elements. Tubular wire screen covered filter elements may also be cleaned in this manner. Moreover, if cloth covered filter elements are used, the cloth covers may be removed and hand cleaned and then washed. Another type of filter normally used is the leaf type screen filter. The leaf type screen filters are illustrated in the drawing as 14. These leaf type screen filter elements may be cleaned by reversing the direction of flow of the dry cleaning media as aforedescribed, or by hand scraping the filter elements with a suitable scraper or brush. Moreover, many leaf type filter elements may be cleaned by oscillating the screens back and forth, by means of an oscillating device attached thereto, in the dry cleaning media to wash off the filter coating. Other devices are available to scrape the filter coating from the leaf type filter elements without removing the leaf type filter elements 14 from the filter 10.

Whenever the filter coating is removed from the filter elements without removing the filter elements, sludge usually collects at the bottom of filter 10. This sludge may be removed from filter 10 by opening a drain (not shown) at the bottom of filter 10 adapted so that the sludge may be easily removed from inside of filter 10.

This invention however is not to be construed as limited to the dry cleaning cycle set forth herein or the apparatus shown herein as the apparatus and cycle described herein is merely exemplary of the various dry cleaning apparatus and dry cleaning cycle known in the art.

In order to more fully illustrate the nature of this invention and the manner of practicing the same, the following examples are presented.

EXAMPLE 1

The purpose of this example is to set forth the preparation of a typical siliceous amino compound which can be used in practicing this invention and which is used in Example II.

(A) *Preparation of the silica sol*

3.0 lbs. of isophthalic acid and 14 lbs. 6 oz. of a 40° Bé. sodium silicate ($Na_2O:3.22SiO_2$) solution were dissolved in 240 lbs. of water. The resultant clear sodium isophthalate solution was diluted by the addition of 170 lbs. of water thereto. The solution was then agitated while heating to a temperature of 80° C. and diluted with 220 lbs. of water.

A magnesium sulfate solution containing 2 lbs. 14 oz. of magnesium sulfate ($MgSO_4 \cdot 7H_2O$) dissolved in 15 lbs. of water was slowly added to the solution containing sodium isophthalate. A cloudy slurry formed. The slurry was allowed to cool to 50° C. whereupon 1.5 lbs. of sodium fluosilicate was dissolved therein. The slurry was then cooled to 40° C.

A diluted sulfuric acid solution prepared by adding 9 lbs. 2 oz. of 96% sulfuric acid to 52 lbs. of water was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated with agitation to 55° C.

(B) *Preparation of the partial amide salt*

3.0 lbs. of the monoamide of hydrogenated tallow fatty acids and aminoethylethanolamine was dissolved in 60 lbs. of varnish maker's and painter's naphtha at a temperature of from 80° C. to 85° C. To this clear solution was then added 382 grams of glacial acetic acid thus forming a clear solution of monoamide acetate.

(C) *Preparation of the siliceous amino compound*

The partial amide salt solution prepared above in part B and a sodium silicate dilution prepared by diluting 36 lbs. 9 oz. of a 40° Bé. sodium silicate ($Na_2O:3.22SiO_2$) solution with 40 lbs. of water, were slowly added at the same time to the silica sol of part A. When the partial amide salt solution and the sodium silicate dilution were added to the silica sol, the water-soluble sodium salt of isophthalic acid formed from the aromatic acid present in the silica sol and dissolved, and the siliceous amino compound was formed at the same time. During this addition, the silica sol was agitated and care was taken to keep the partial amide salt solution in excess at all times to minimize heavy gel formation. The temperature of the slurry was maintained during the addition between 61° C. and 64° C. The filtrate from a filtered sample of the slurry had a pH of 7.5.

The slurry was digested by allowing it to stand for eighteen hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% sulfuric acid to this filtrate, a slight white haze developed indicating that practically all of the water-soluble isophthalate salt had been converted to the substantially insoluble isophthalic acid.

(D) *Recovery of the siliceous amino compound*

The slurry was heated with agitation to a temperature of 70° C. and filtered. The filter cake was washed four times, each time adding 700 lbs. of water, agitating the slurry, and filtering. The washed filter cake was dried at a temperature of 165° F. and ground in a Metals Disintegrating Company Micro-Pulverizer through a 1/64" screen. A yield of 28 lbs. of a finely ground material was obtained.

EXAMPLE II

The purpose of this example is to demonstrate that the use of the siliceous amino compound, prepared in a manner substantially as in Example I, is effective in removing acidic materials from the dry cleaning media during the dry cleaning of successive loads of dirty clothing.

The apparatus used was a commercial dry cleaning apparatus commonly found in dry cleaning establishments. The rated capacity of the dry cleaning apparatus was 25 to 30 pounds of soiled garments.

The clothing used for the successive loads were soiled by normal wear so that they contained the usual amount of grit and grime, body acid, and other body eliminations. The clothing used was classified as wools, or silks. The term wool encompasses fabrics composed of wool, wool containing blends such as wool and Dacron, heavy cottons such as cotton corduroys, and the like. The term silk encompasses all other fabrics including light weight cottons such as summer cotton clothing, and the like.

The cleaning solvent used was perchlorethylene containing 1½% of "Adco," a typical commercial synthetic detergent, and enough moisture to produce a solvent relative humidity of 70 to 75%.

Twelve ounces of the siliceous amino compound prepared substantially as in Example I were added to six pounds of the filter media, i.e., diatomaceous earth filter powder, which was in a container. The container was then closed and the ingredients were well mixed by hand shaking and rolling the container. 3 pounds 6 ounces of this mixture was then used to coat the filter elements by introducing the dry cleaning media, filter media and siliceous amino compound into opening 12 into filter 10 and starting pump 8, as previously described. Before each load of dirty clothing was run, an additional six ounces of this mixture was added to the dry cleaning system.

Samples of the dry cleaning media were removed and the acid number determined at various times during the treatment of a total of 21 loads of dirty garments. The coating was removed from the filter elements and a new coating placed on the filter elements in the aforedescribed manner, after the eighth and sixteenth cleaning cycle. However, the dry cleaning media was not changed during the cleaning of the twenty-one loads of soiled clothing. Moreover, at no time was additional soap added during the cleaning of the twenty-one loads of soiled clothing.

Ordinarily, when successive loads of soiled garments are cleaned, the acid number of the dry cleaning solvent rises gradually due to the removal of fatty acids from the soiled garments, to the point where steps must be taken to overcome the high acid number. As the table below illustrates, the siliceous amino compound was effective in controlling the acid number of the dry cleaning media. The initial acid value after the first coating of the filter elements and before any soiled clothing was cleaned, was due to the detergent used.

CONTROL OF ACID NUMBER IN A DRY CLEANING SYSTEM USING A SILICEOUS AMINO COMPOUND

| Load No. | Type of clothing cleaned | Acid number of dry cleaning media after cleaning the clothing or after coating the filter elements | Percent of detergent present by weight of solvent present after cleaning the clothing or after coating the filter elements |
| --- | --- | --- | --- |
| 1st coating of filter element | | 1.78 | 1.50 |
| 4 | Wool | 1.74 | 1.50 |
| 8 | Wool | 1.76 | 1.50 |
| 2d coating of filter element | | 1.72 | 1.50 |
| 12 | Wool | 1.72 | 1.50 |
| 16 | Silk | 1.72 | 1.50 |
| 3d coating of filter element | | 1.72 | 1.49 |
| 21 | Silk | 1.72 | 1.50 |

Because additives which are normally used to reduce the acid number of the dry cleaning media also remove soap or detergent from the dry cleaning media, it was unexpected and surprising that, as the above table shows, the use of a siliceous amino compound in a dry cleaning media not only controlled the acid number of said dry cleaning media, but also did not remove the detergent from the dry cleaning media. This is demonstrated by the data appearing in column 4 of the above table. In column 4, it is seen that the amount of detergent present was substantially maintained throughout all twenty-one dry cleaning cycles and all three coating operations.

While this invention has been described in terms of certain preferred embodiments and illustrated by means of specific examples, the invention is not to be construed as limited except as set forth in the following claims.

What we claim as new and desire to secure by Letters Patent is:

1. A filter coating composition for use in detergent containing dry cleaning systems during the dry cleaning of fabrics, said dry cleaning composition being capable of removing liquid acidic materials from the dry cleaning system during the dry cleaning of fabrics without removal of detergent, said filter coating composition consisting essentially of diatomaceous earth and a siliceous amino composition, said siliceous amino composition containing a siliceous amino compound (a) produced by reacting a material selected from the group consisting of a water-soluble salt of a partial amide, a water-dispersible salt of a partial amide, a water-soluble salt of an imidazoline, a water-dispersible salt of an imidazoline, a water-soluble salt of an oxazoline and a water-dispersible salt of an oxazoline, said partial amide being prepared by reacting an alkylene polyamine with a material selected from the group consisting of aliphatic monocarboxylic acids, their esters and their acyl halides containing the radical RCO—, said R containing from about 5 to about 21 carbon atoms, glycerides, naphthenic acid and tall oil, and (b) an approximately stoichiometrically equivalent quantity of a silicate salt consisting of sodium silicates, potassium silicates, and ammonium silicates, sufficient to neutralize all of the acid radicals of said salt of said partial amide and there being present by weight in said filter coating composition from about 6 to about 10 parts by weight of diatomaceous earth for each part by weight of said siliceous amino composition.

2. A filter coating composition according to claim 1 wherein said siliceous amino composition contains free silica in amounts up to about 85% based on the weight of said siliceous amino composition.

References Cited by the Examiner
UNITED STATES PATENTS

| | | | |
|---|---|---|---|
| 301,015 | 6/84 | Sommers | 210—502 |
| 328,947 | 10/85 | Johnson | 210—502 |
| 2,059,475 | 11/36 | Myers | 8—142 |
| 2,072,332 | 3/37 | Hatfield | 8—142 |
| 2,220,124 | 11/40 | Seaton | 210—502 |
| 2,395,003 | 2/46 | Kirk | 8—94.19 |
| 2,408,656 | 10/46 | Kirk | 8—94.19 |
| 3,024,164 | 3/62 | Sawyer | 167—42 |
| 3,099,626 | 7/63 | Riede | 252—163 |
| 3,129,176 | 4/64 | Ihde | 252—28 |

JULIUS GREENWALD, *Primary Examiner.*

MORRIS O. WOLK, *Examiner.*

UNITED STATES PATENT OFFICE
CERTIFICATE OF CORRECTION

Patent No. 3,215,278                      November 2, 1965

Louis J. Owen et al.

It is hereby certified that error appears in the above numbered patent requiring correction and that the said Letters Patent should read as corrected below.

Column 3, line 30, for "3,129,181" read -- 3,168,539 --.

Signed and sealed this 1st day of August 1967.

(SEAL)
Attest:

EDWARD M. FLETCHER, JR.
Attesting Officer

EDWARD J. BRENNER
Commissioner of Patents